United States Patent [19]
Laird

[11] Patent Number: 5,667,682
[45] Date of Patent: Sep. 16, 1997

[54] SELF-CLEANING FILTRATION APPARATUS

[75] Inventor: Kenneth Edward Laird, Hattisburg, Miss.

[73] Assignee: Water Renewal Systems L.P., Hattisburg, Miss.

[21] Appl. No.: 547,875

[22] Filed: Oct. 25, 1995

[51] Int. Cl.⁶ .................... B01D 29/70; B01D 29/72; B01D 29/74; B01D 33/52

[52] U.S. Cl. .................. 210/407; 210/360.1; 210/380.1; 210/381; 210/393; 210/411; 210/493.5; 210/388; 210/107; 55/293; 55/304; 55/305

[58] Field of Search ........................ 210/791, 107, 210/360.1, 380.1, 381, 389, 391, 394, 393, 407, 411, 493.1, 493.2, 493.5, 388; 55/293, 304, 305

[56] References Cited

U.S. PATENT DOCUMENTS

| | | |
|---|---|---|
| 1,225,696 | 5/1917 | Bicalky . |
| 1,566,929 | 12/1925 | Thune . |
| 2,129,188 | 9/1938 | Wood . |
| 2,145,535 | 11/1939 | Vokes . |
| 2,661,845 | 12/1953 | Sullivan . |
| 2,712,387 | 7/1955 | Young . |
| 3,096,281 | 7/1963 | Smith et al. . |
| 3,291,310 | 12/1966 | Marvel . |
| 3,486,626 | 12/1969 | Close . |
| 3,574,509 | 4/1971 | Zentis . |
| 3,622,006 | 11/1971 | Brunner . |
| 3,750,885 | 8/1973 | Fournier . |
| 4,108,778 | 8/1978 | Lambert . |
| 4,301,012 | 11/1981 | Puckett . |
| 4,302,330 | 11/1981 | Cusato . |
| 4,517,090 | 5/1985 | Kersten . |
| 4,822,486 | 4/1989 | Wilkins et al. . |
| 4,944,887 | 7/1990 | Frederick . |
| 5,192,429 | 3/1993 | Bader . |

*Primary Examiner*—Thomas M. Lithgow
*Attorney, Agent, or Firm*—Foley & Lardner

[57] ABSTRACT

An apparatus and method for filtering a fluid containing contaminants is provided whereby the apparatus includes an inlet for drawing fluid from a fluid source, a housing having attached thereto the inlet, a contaminant outlet, a clean outlet, a filtering assembly and a mechanism for agitating the filtering assembly. The filtering assembly has an upper or upstream end connected to the inlet and a lower or downstream end connected to the contaminant outlet. The filtering assembly is disposed within the housing and is connected to the contaminant outlet whereby fluid is introduced to the filter assembly at an upper end of the filtering assembly by the fluid inlet and whereby fluid is passed through the filtering assembly to provide clean, filtered fluid which is discharged via the clean outlet, and debris and other contaminants contained in the fluid are separated from the fluid and retained by the filtering assembly. The debris and other contaminants that are retained by the filtering assembly are discharged via a lower or downstream end of the filtering assembly, and through the contaminant outlet. The agitating mechanism agitates the filtering assembly to move the filtering assembly through the clean, filtered fluid to independently remove the debris and contaminants that have been retained by the filtering assembly.

10 Claims, 11 Drawing Sheets

SELF-CLEANING FILTRATION APPARATUS

BACKGROUND OF THE INVENTION

1. Field of the Invention

This invention relates to a self-cleaning filter for filtering fluids contaminated with debris and other contaminants. Specifically, this invention relates to a self-cleaning filter containing a movable filtering assembly which can be agitated during operation of the filter to automatically remove the debris and other contaminants that may accumulate on the filter assembly. The debris is collected and discharged from the filtering assembly and the clean, filtered fluids are discharged from the filter separate from the debris. The agitation of the filtering assembly permits rapid, continuous and easy removal of debris and other contaminants that operates independent of scraping or backwashing the filter assembly using pressurized water or air.

2. Description of Related Art

There are numerous occasions when fluids such as water and air must be filtered. One problem associated with every filtering system is that the filter inevitably will collect and accumulate debris and other contaminants present in the fluid, which, after a period of time, will prevent the filter from operating as intended. Many systems have been developed that serve to prevent the accumulation of debris on the filter surface.

It is well known to backwash filtering assemblies. But backwashing typically involves periodic down-time for the filtering assembly whereby forced water or air is directed against the filter in a direction opposite the direction of fluid flow to remove the accumulated debris. It also is known to employ a continuous back-washing system which solves one of the aforementioned problems in that the filtering apparatus need not be turned off as frequently. U.S. Pat. Nos. 5,192,429 and 4,822,486, describe continuous rotary self-cleaning filters that rotate about stationary nozzles (or stationary filters with rotating nozzles) whereby the nozzles direct spray against one side of the filter screen assembly in an attempt to force debris away from the other side of the filter screen assembly. These filter assemblies suffer from the drawback that the debris that is forced away from the screen assembly is not removed from the filter and therefore remains in the un-filtered water. After a period of time, the debris in the un-filtered water will become so concentrated that the filter will eventually become clogged and fail.

Other systems such as those disclosed in U.S. Pat. No. 3,622,006 have been developed whereby the filtering assembly is rotated and passes a collecting trough that includes an elongated mouth and lip that serve to scrape off debris that has accumulated on the filtering assembly. The debris that is scraped off then is drained away from the filter. The collecting trough and corresponding elongated mouth will eventually wear from the scraping action and will require replacement.

There are numerous other self-cleaning filtering assemblies that operate under similar principles whereby either a blade-type apparatus is used to scrape off the accumulated debris, or a forced water or air system is employed to back-wash the filtering assembly during its operation. The use of these extraneous mechanisms is expensive and difficult to fabricate and operate effectively. The design of many of the prior art self-cleaning filtering systems makes it quite difficult to replace the filter elements when different fluids are to be filtered or when a larger or smaller mesh filter is needed. These filters also will eventually wear or debris will become so concentrated in the filtering fluid that the filter will fail to operate.

Thus, there exists a need to develop a self-cleaning filtering system that is simple and easy to operate, and which makes it simple and easy to remove and replace the filter assembly. There also exists a need to develop a self-cleaning filter that does not involve an additional scraping mechanism or a forced water or air back-washing mechanism that forces the accumulated debris from the filter; thus, creating a self-cleaning filter that independently removes accumulated debris. There also exists a need to develop a self-cleaning filtering system which continuously filters a contaminated fluid, continuously removes debris and other contaminants from the filter that have accumulated on the filtering assembly, and that continuously removes clean filtered fluid from the filtering assembly.

SUMMARY OF THE INVENTION

It is therefore an object of the present invention to provide a self-cleaning filter apparatus that is simple and easy to operate. It is an additional object of the present invention to provide a self-cleaning filter apparatus which independently removes accumulated debris or contaminants on the filter without either scraping the contaminants from the filter or by backwashing the filter using forced water or air. It is a further object of the present invention to provide a self-cleaning filter that continuously filters a contaminated fluid and which continuously removes from the apparatus debris and other contaminants that have accumulated on the filter.

In accordance with these and other objectives of the present invention, there is provided a self-cleaning filter apparatus for filtering a fluid containing debris and other contaminants. The apparatus includes a housing having attached thereto an inlet for drawing fluid from a fluid source, a contaminant outlet operatively attached to the housing, a clean outlet operatively attached to the housing and disposed downstream from the inlet, a filtering assembly and a mechanism for agitating the filtering assembly.

The filtering assembly includes an upstream end and a downstream end. The filter assembly is disposed within the housing so that fluid is introduced to the filter assembly through the fluid inlet at the upstream end of the filtering assembly, and the fluid passes through the filtering assembly to provide clean, filtered fluid which is discharged through the clean outlet. Debris and other contaminants contained in the fluid are separated from the fluid and retained by the filtering assembly and are discharged through the downstream end of the filtering assembly and through the contaminant outlet. The agitating mechanism agitates the filtering assembly to move the filtering assembly through the fluid to independently remove the debris and contaminants that have been retained by the filtering assembly.

In accordance with another object of the invention, there is provided a method of filtering a fluid containing debris and other contaminants comprising passing the fluid through a filtering assembly to separate debris and other contaminants from the fluid and to produce a clean, filtered fluid. The filtering assembly is agitated to independently remove debris and other contaminants that have accumulated on the filtering assembly. The method further comprises discharging the debris and other contaminants from the filtering assembly, and discharging the clean, filtered fluid from the filtering assembly.

In accordance with an additional object of the present invention, there is provided a self-cleaning filter apparatus whereby the filtering assembly is enclosed in a housing as described above (including the inlet, contaminant outlet and clean outlet) and the filtering assembly is conical. The conical filtering assembly is agitated in a direction parallel to the longitudinal axis of the filtering assembly. In accordance with an additional object of the invention, there also is provided an additional agitating mechanism disposed within the conical filtering assembly which agitates the fluid inside the filtering assembly to assist in the removal of debris and other contaminants that have accumulated on an upstream side of the filtering assembly.

In accordance with yet another object of the present invention, there is provided a self-cleaning filter apparatus with a filter assembly that is rotated in a housing as having an inlet, a contaminant outlet and a clean fluid outlet in order to independently remove accumulated debris and other contaminants from the filter assembly. The filtering assembly is rotated for a fixed number of rotations in a first direction with respect to the longitudinal axis of the filtering assembly, and then rotated for a fixed number of rotations in a second direction with respect to the longitudinal axis of the filter assembly. The filtering assembly has an axial cross-section shape that enables the removal of accumulated debris and other contaminants when the filtering assembly is rotated. Preferably, the filter assembly includes spokes extending axially from a center hub, and more preferably has a transverse cross-sectional star-shape.

In accordance with further objectives of the present invention, there is provided a self-cleaning filter apparatus and method of filtering as described above which further includes a recycle process. During this process, debris and other contaminants that are removed from the filtering assembly are recycled to the contaminated fluid inlet. There is further provided an apparatus and method for filtering a fluid as described above whereby the fluid is water or air, and whereby the agitating mechanism is an electric motor.

The foregoing features, advantages and benefits of the invention, along with additional ones, will be seen in the ensuing description and claims. In addition, the foregoing objectives and other objects of the present invention will be readily apparent to those skilled in the art upon reviewing the detailed description and drawings which follows.

DETAILED DESCRIPTION

In the drawings, like references numerals refer to like features. Throughout this description, the terms "filter" and "filtering assembly" will be used interchangeably and denote materials that are capable of removing debris and other contaminants from a fluid. Throughout this description, the term "contaminated fluid" denotes any fluid, water or gas, that is contaminated with debris or other contaminants that can be removed by filtration. Throughout this description, the phrases "debris and other contaminants" and "debris" and "contaminants" will be used interchangeably and denote undesirable materials present in the fluid that are capable of being filtered. Those skilled in the art are capable of determining the appropriate filter required to filter debris and other contaminants from a fluid. The phrase "independently remove debris and other contaminants from the fluid," as it is used throughout this description, preferably denotes removal of such debris by the apparatus alone without the need for additional forced air or water back-washing mechanisms.

Figure 1:
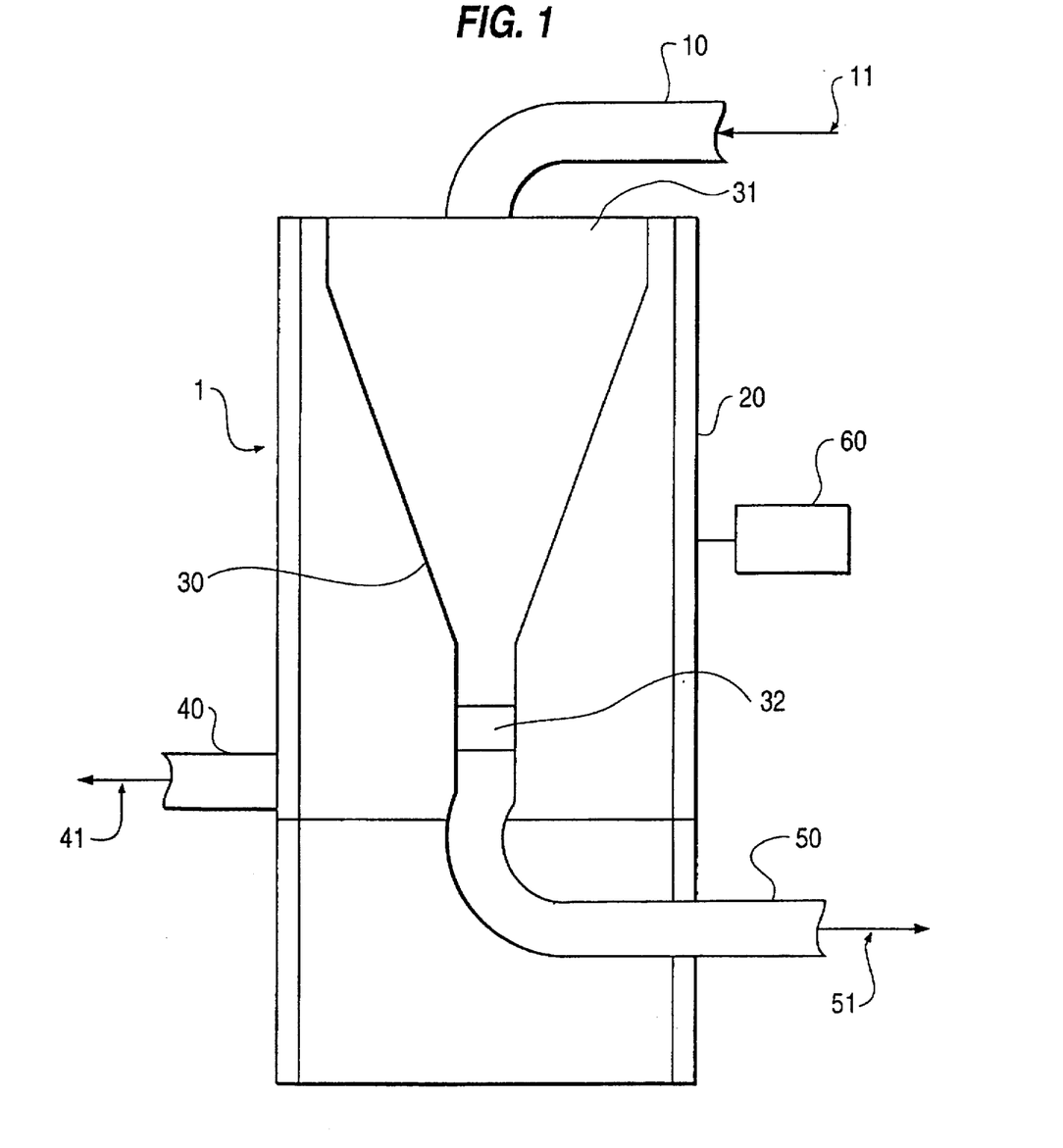
FIG. 1 illustrates a self-cleaning filter apparatus according to the present invention.

Referring now to FIG. 1, there is shown a self-cleaning filter apparatus 1 which includes an inlet 10 for drawing fluid from a fluid source (not illustrated in the figures), a housing 20 having attached thereto or integrally connected therewith, the inlet 10, a contaminant outlet 50 for debris and other contaminants and a clean outlet 40 for filtered fluids. The housing 20 has enclosed therewith a filter 30, and has enclosed therewith or attached thereto a mechanism 60 that serves to agitate the filter 30. The filter 30, enclosed within the housing 20, includes a filter having an upstream end 31 for receiving the fluid from the inlet and a downstream end 32 for discharging the debris through the contaminant outlet 50. The fluid passes through the inside of the enclosed filter 30 and clean fluid is present on the outside of the filter where it is collected within the housing 20 and discharged through the clean outlet 40. The mechanism 60 agitates the filter 30 so that the filter 30 moves through the clean fluid and independently removes the debris and contaminants that have accumulated thereon. By agitating the filter 30 the accumulated contaminants can be removed without the need for an additional forced air or water back-washing mechanism or a scraping mechanism. The debris and other contaminants that are removed from the upstream side of filter 30 are collected and removed through the contaminated outlet 50.

The fluid entering the self-cleaning filter assembly 1 can be any fluid containing debris and contaminants that need to be filtered. Typically, the fluid is water contaminated with soil and other organisms. The fluid also can be air contaminated with dust and other particulate materials that can be filtered using a screen or wire mesh. While not limited to those specifically mentioned, other contaminants can be filtered in accordance with the present invention include any solid suspended in a liquid, organic particles, food particles, bacteria, hazardous chemicals or biological material, particulate material, oil from water, and the like. Those skilled in the art are capable of determining the specific mesh size and type of filter needed to effect the desired filtration.

Typically, the contaminated fluid 11 is transported to the self-cleaning filter apparatus 1 via inlet 10 under the impetus of pressure. This pressure can be supplied by a pump exterior to the filtering assembly 1 or a vacuum established within the filtering assembly 1. Preferably, contaminated fluid 11 is transported using a pump.

Filtering apparatus 1 includes a housing 20 that typically is cylindrically shaped and which houses the filter 30. Housing 20 can be constructed of any material capable of withstanding the pressure of the filtration and capable of withstanding the agitation of filter 30. Usually, housing 20 is fabricated using steel or other metal alloys, although concrete and other materials can be used, especially if contaminated fluid 11 is highly toxic or corrosive. The skilled artisan is capable of designing a suitable housing 20 which can be used in the present invention.

Filter 30 can be made from any material and of any design capable of filtering debris and contaminants from contaminated fluid 11, and capable of withstanding the agitation force of the agitating mechanism 60. Typically, filter 30 is comprised of a fine or small mesh screen, or a combination of fine screens and coarser screen secured to one another, although any known filtering media may be used in accordance with the invention. Other filtering media include cloth, felt, and other foraminous materials, as well as reverse osmosis membranes and ultrafiltration membranes. The skilled artisan is capable of determining the specific type of filter 30 needed depending upon the amount, size and type of debris and other contaminants present in contaminated fluid 11.

Filter 30 also may be any shape that enables self-cleaning by the agitation thereof. The filter 30 has a longitudinal axis parallel to the longitudinal axis of the self-cleaning filter apparatus 1. In a first embodiment of the filter assembly, a conical filter 30 typically is employed when the filter agitates in a direction parallel to the longitudinal axis thereof (i.e., up and down as depicted in FIG. 1). Hence, as the conical filter 30 passes down through clean filtered fluid, any debris or other contaminants that have accumulated on the upstream side of filter 30 will be removed.

In a second embodiment of the filter assembly, a filter 30 is utilized so that the filter is agitated by rotating the filter assembly, i.e., rotating about the longitudinal axis as shown in FIG. 1. In this embodiment filter 30, the axial cross-section of the filter is designed so that debris and other contaminants that have accumulated thereon will be removed when filter 30 rotates back and forth through the clean, filtered fluid. Preferably, filter 30 has spokes extending axially and connected to one another to form an oval (i.e., two spokes) transverse cross-section, or has multiple spokes extending axially to form a star-shape (i.e., five or six spokes) transverse cross-section. In one of the preferred embodiments of the second embodiment of the filter assembly, the filter assembly is provided with a star-shape in a transverse cross-section, while having a uniform longitudinal configuration (hereinafter referred to as star-shaped filter). The debris and other contaminants that are removed during the agitation of the cylindrical filter 30 are collected and removed via the contaminated outlet 50. Those skilled in the art recognize that an external pressure or vacuum source can be used to facilitate or assist in the removal of contaminants through contaminated outlet 50.

Clean outlet 40 and contaminated outlet 50 are designed to remove the clean, filtered fluid 41 and the debris and other contaminants 51, respectively, from the self-cleaning filter apparatus 1. In the embodiment shown in FIG. 1, the contaminated outlet 50 is connected to an end of filter 30 whereby debris and contaminants accumulate on the inside of filter 30. Preferably, the arrangement depicted in FIG. 1 is used whereby contaminated fluid 11 enters from the inside of filter 30.

The self-cleaning filtering apparatus 1 of the present invention also includes an agitating mechanism 60 that serves to agitate filter 30 to remove accumulated debris and other contaminants. Any means for agitating filter 30 can be employed including manual agitation, a drive chain and gearing mechanism, hydraulic agitating mechanism, a motor (gas, diesel, electric, etc.), and the like. Preferably, agitating mechanism 60, 600 or 605 is a motor. In the embodiment illustrated in FIG. 2, agitating mechanism 600 is disposed at the bottom of the self-cleaning filter assembly 1 and serves to agitate filter 300 in a direction parallel to the longitudinal axis of filter 300. In the embodiment illustrated in FIG. 4A, agitating mechanism 605 is disposed at the top of the self-cleaning filter assembly 1 and serves to agitate filter 300 with respect to the longitudinal axis of filter 300 by rotating the filter in opposite directions. These rotations can be continuous in one direction and then in the other direction, or alternating in opposite directions. Although not illustrated in FIG. 4B, this second embodiment of the filter assembly also includes an agitating mechanism.

Figure 2:
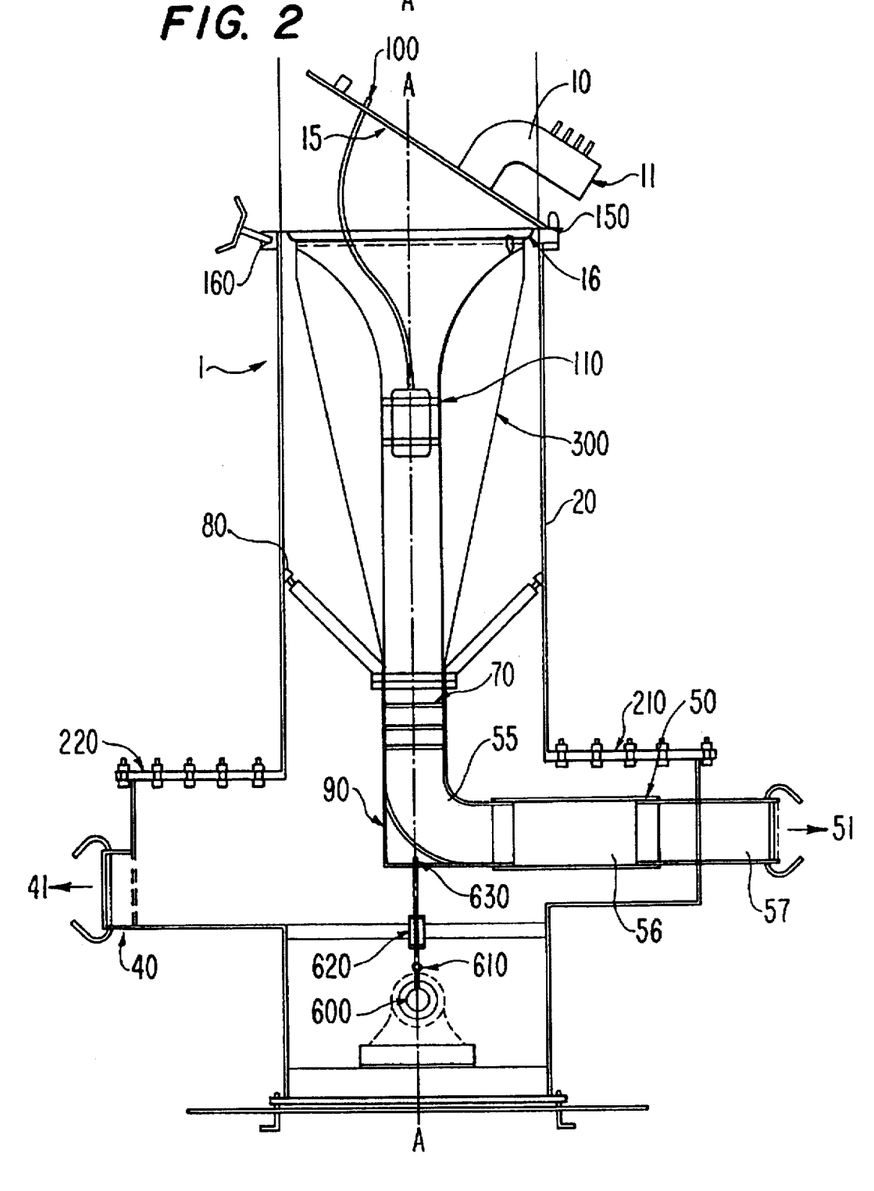
FIG. 2 illustrates a preferred self-cleaning filter apparatus whereby the filter assembly is conically shaped and is agitated in a direction parallel to the longitudinal axis of the filtering assembly.
Figure 2A:
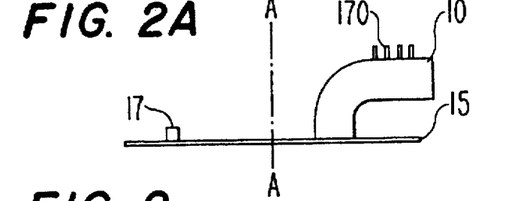
FIG. 2A illustrates a side top view of the top of the self-cleaning filter apparatus of FIG. 2.
Figure 3:
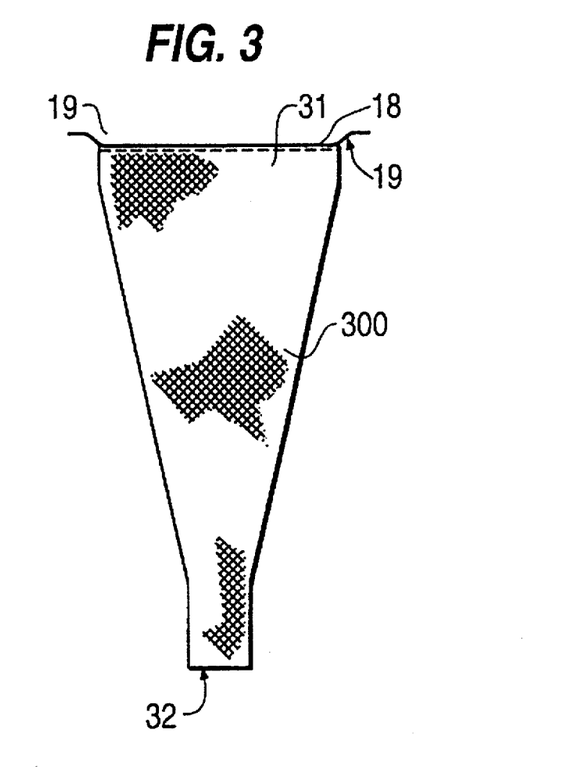
FIG. 3 illustrates a side view of the conically shaped filtering assembly of the self-cleaning filter apparatus of FIG. 2.

FIGS. 2, 2A and 3 all illustrate a preferred embodiment whereby filter 300 is conically shaped and is agitated by agitating mechanism 600 in a direction parallel to longitudinal axis A—A shown in FIG. 2. In this embodiment, filter 300 is conical in shape and can be connected to a removable lid 15 via gasket 16. As shown in FIG. 3, conical filter 300 includes an upstream end 31 and a downstream end 32. Upstream end 31 of filter 300 can be disposed within the housing 20 by connecting filter 300 to ring 18 and then connecting ring 18 to gasket 16. Gasket 16 serves to seal the upstream end of self-cleaning filter assembly 1 when lid 15 is closed. Preferably, filter 300 includes a solid band (not shown) welded at the top of the filter cone, and a flange 19 is welded to the band. Flange 19, shown in FIG. 3A, can be drilled to include holes corresponding to the holes present in ring 18 so that ring 18 and flange 19 can be firmly secured to one another by means of screws, rivets, and the like. In a similar fashion, ring 18 and flange 19 can be connected to gasket 16. Gasket 16 overlaps the top of housing 20 to seal lid 15.

Any material such as rubber can be used to form gasket 16 as long as the material can form an effective seal with lid 15, and as long as the material permits longitudinal displacement of filter 300. Typically, an elastomeric material such as can be used as gasket 16, and preferably, the gasket is made of neoprene. Moreover, any material that forms an effective seal and that has been approved by the FDA as a food-grade material can be used. Gasket 16 serves to keep contaminated fluid 11 separated from clean, filtered fluid 41, and also allows filter 30 to vibrate (i.e., move axially) freely up and down.

Figure 3A:
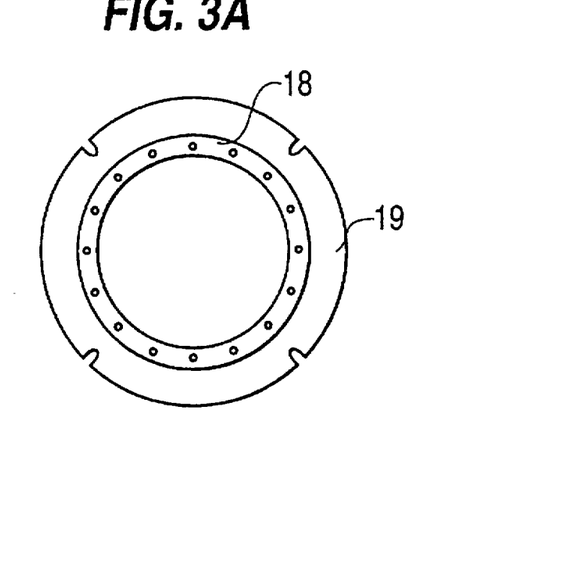
FIG. 3A illustrates a top view of the ring illustrated in FIG. 3 attached to a gasket.

Ring 18 can be made of any material which enables attachment of filter 300 to gasket 16. Typically, ring 18 is made of a rigid material such as steel, metal, metal alloys, plastics and the like, and preferably, ring 18 is comprised of stainless steel. Preferably, ring 18 is attached to flange 19 using screws or bolts, but ring 18 can be attached to flange 19 by other means such as adhesives or welding.

Lid 15 can be constructed of the same or different material than housing 20. Preferably, lid 15 is constructed of a light-weight, sturdy material such as aluminum. Lid 15 preferably is mounted on a hinge or hinges 150 and is sealed with gasket 16. Lid 15 has an attachment (not shown) to allow inlet 10 to pass therethrough and permit the introduction of contaminated fluid 11 to the filtering device. Because various inlet pipes 10 may be used depending upon the contaminated fluid 11 to be filtered, the attachment in lid 15 is designed to permit a quick connection and disconnection with various inlet pipes 10. The skilled artisan readily recognizes how to design various quick connection attachments suitable for use in the present invention.

Optionally, lid 15 also may include an opening to permit air hose 100 to pass therethrough. Air hose 100 may be utilized as an auxiliary source of vibration to assist in removal of accumulated debris on filter 300. In accordance with this embodiment, air hose 100 is connected to a small vibrator 110 mounted in the center of filter 300. The small vibrator 110 causes filter 300 to vibrate and also produces soundwaves which will transmit through the contaminated fluid and aid in the filtering process. In addition, inlet 10 may be equipped with a manifold 170 which enables the introduction of chemicals which break down solids and enhance the filtering efficiency.

The non-hinged portion of lid 15 can be attached to housing 20 with snap lugs or wing nuts 160 for quick removal and replacement. Lid 15 also is equipped with a handle 17 which permits easy lifting and lowering of the lid.

Figure 8A:
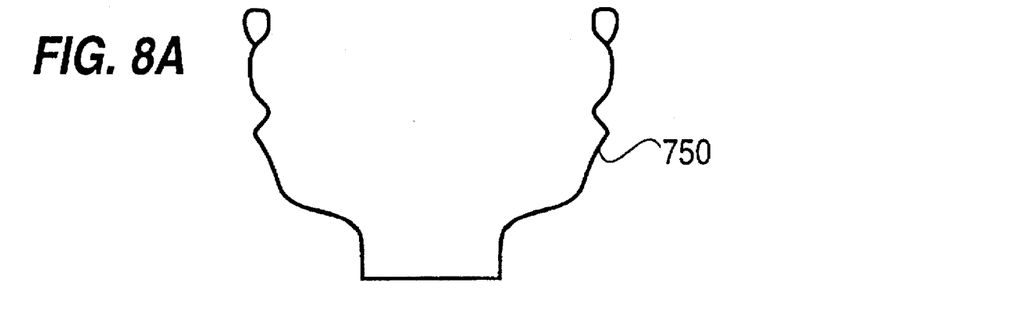
FIG. 8A illustrates a snap ring useful in securing the filter assembly of FIG. 3 to the contaminated fluid outlet.
Figure 8B:
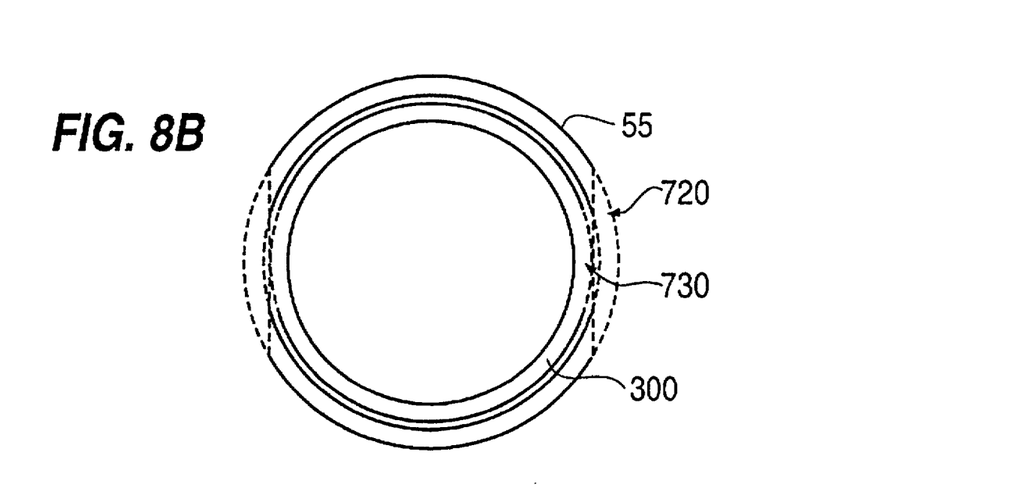
FIG. 8B illustrates a top view of a portion of the filter assembly and contaminated fluid outlet each having notches cut therein to accept the snap ring of FIG. 8A.
Figure 8C:
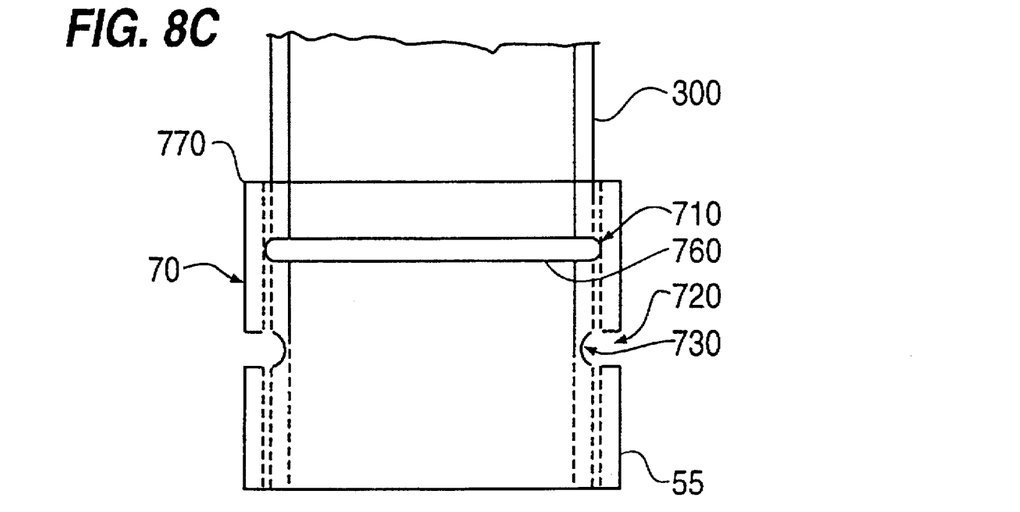
FIG. 8C illustrates a side view of a portion of the filter assembly and contaminated fluid outlet each having notches cut therein to accept the snap ring of FIG. 8A.

The downstream end 32 of filter 300 can be attached to contaminated outlet 50 by means of coupling unit 70, elbow 55, hose 56 and discharge pipe 57. Filter 300 is attached to coupling unit 70 using a snap ring 750. As shown in FIGS. 8A, 8B and 8C, downstream end 32 of filter 300 has two grooves, an upper groove 710 and a lower groove 730. The upper groove 710 permits the seating of an O-ring 760, which can be made of the same or different material than gasket 16. The bottom groove 730 permits attachment via snap ring 750. Elbow 55 also has a groove 720 formed therein to permit attachment via snap ring 750. Using the preferred configuration illustrated in FIGS. 8A, 8B and 8C, filter 300 can be attached to contaminant outlet 50 in a manner that seals off the contaminated fluid from the clean, filtered fluid while leaving the downstream end 32 of filter 300 and the upper end of elbow 55 open for discharge of solids.

As shown in FIG. 2, elbow 55 can be formed in a rounded 90° angle, which assists in preventing clogging in contaminant outlet 50 while solids are discharged. Numerous mechanisms can be employed to discharge contaminants from self-cleaning filter apparatus 1 without the need of a 90° elbow 55. Those skilled in the art are capable of designing a contaminant outlet 55 using various geometries and angles, and the particular embodiment depicted in FIG. 2 represents a preferred embodiment.

As illustrated therein, elbow 55 is connected to a hose 56. Hose 56 preferably is a flexible hose so that the filter assembly 300 can move axially. Hose 56 can be made of any elastomeric material including, but not limited to, the same materials used to make gasket 16. Hose 56, being of elastomeric material, compensates for the longitudinal displacement of filter 300 during operation of self-cleaning filter assembly 1. Preferably, hose 56 is comprised of neoprene. Hose 56 is connected to discharge pipe 57, which is connected to housing 20 by welding, adhesive, or any other means of integrally connecting discharge pipe 57 to housing 20. If the hose 56 is not flexible, an alternative flexibly joint connection can be included to connect discharge pipe 57 to filter assembly 300. A valve (not shown) can be disposed within discharge pipe 57 to permit periodic dumping of contaminants (solids), when necessary.

Elbow 55 may include a flange 770 (FIG. 8C) on the upper portion thereof, which can be welded and affixed thereto. Flange 770 permits attachment of an elastic member 80. The elastic support member can be a rubber strap or preferably a support spring. Elastic support members 80 are attached to the inner wall of the housing 20. Elastic support members 80 support the weight of the filter 300 while allowing for the longitudinal movement of filter 300 during operation. In a preferred embodiment, four elastic support members 80 are utilized, although those skilled in the art appreciate that any number of support springs 80 can be used to provide the desired effect.

As shown in FIG. 2, the longitudinal movement or vibration of filter 300 is effected by agitating mechanism 600 which is attached to the filter 300. Agitating mechanism 600 can be any mechanism that will provide axial reciprocating (up and down) longitudinal movement of filter 300 including, but not limited to, manual means, pumps, hydraulic lifts, motors (gas, diesel, electric, etc.), and the like. The particular agitating mechanism 600 employed typically will depend upon the size of filter 300 and the amount of vibration desired. Preferably, the agitating mechanism is a motor that drives a connecting arm or shaft 610. More particularly, the agitating mechanism 600 is an electric motor, and more preferably, a 1.5 HP motor operating at 1750 rpm with variable speed control, and including a 0.25" cam shaft driven by the motor via a 25:1 ratio speed reduction box.

Elbow 55 also can be attached to a bracket 90 (by welding, adhesives, etc.) on the sloping side thereof which allows for level attachment of shaft 610 which protrudes through a seal in the bottom portion of the clean fluid reservoir and attaches to bracket 90 by bolt 630.

Shaft 610 can be any type of connecting arm capable of withstanding the stress generated by agitating mechanism 600. Preferably, shaft 610 is a case hardened wrist pin with a threaded portion at the upper end to permit attachment to bracket 90 via castle nut 630. Shaft 610 pierces the clean, filtered fluid reservoir and is surrounded by a bushing 620 which prevents leakage of the fluid and which permits longitudinal displacement of shaft 610. Preferably, bushing 620 is a teflon packed brass bushing that is machine fitted to shaft 610. Alternatively, bushing 620 could be a needle bearing. Moreover, the bushing 620 can be provided with a sealing device such as a lip seal.

Housing 20 further may include two inspection or access boxes 210 and 220 which have bolts on their lids to permit removal or replacement of any bottom parts, such as hose 56 or support springs 80. Preferably, access boxes 210 and 220 are bolted to housing 20 during operation and have a gasket (preferably neoprene) disposed between an outer panel of the access box and the housing 20. Housing 20 may also include a port hole (not shown) disposed immediately adjacent snap ring 750, (FIG. 8A) whereby the port hole has a cover (not shown), preferably a snap-on cover. This port hole and cover permit simple and easy removal of snap ring 750 without having to unbolt either of the access boxes 210 or 220.

To change the filter 300, lid 15 simply is opened, the snap-cover is removed and the snap ring 750 pulled off of the filter 300 and elbow 55. The filter 300 then can be easily lifted from the housing 20 and replaced with another filter should a different filter be needed to filter a different contaminated fluid 11.

The self-cleaning filter apparatus 1 shown in FIGS. 2, 2A, 3, 3A, 8A, 8B and 8C operates in the following manner. Conically shaped filter 300 is suspended in the clean fluid reservoir and connected to an agitating mechanism 600 by a sealed shaft 610 which protrudes through the bottom of the clean fluid reservoir. Contaminated fluid 11 is introduced into self-cleaning filter apparatus 1 from inlet 10 and through lid 15. "Dirty" or contaminated fluid flows through filter 300 and becomes clean, filtered fluid within the clean fluid reservoir. Vibration of filter 300 further aids in forcing contaminated fluid through the walls of filter 300. Vibration and gravity cause solids accumulated on the walls of filter 300 to fall to the downstream side of the apparatus and be forced out of the downstream side via elbow 55, hose 56 and discharge pipe 57 as contaminated fluid 51. Clean fluid 41 exits the downstream end of the apparatus via clean outlet 40.

Contaminated fluid 11 may be continuously introduced to the self-cleaning filter apparatus 1 while contaminated fluid 51 and clean fluid 41 are continuously removed from the filter apparatus. The vibration of filter 300 and its constant passage back and forth through the clean fluid reservoir serve to clean the mesh screens of filter 300. Because filter 300 is suspended in the clean fluid reservoir within housing 20, the weight of filter 300 and contaminated fluid 11 which must be vibrated by agitating mechanism 600 is reduced.

Filter 300 is readily removable from housing 20 and replaced with other filters having varying sizes and shapes in order to effectively filter various different contaminated fluids 11. When lid 15 is raised, a snap-on cover on housing 20 is removed, and snap ring 750 is removed, then the filter 300 can simply be hoisted from housing 20 and replaced. The unique design of self-cleaning filter apparatus 1 of the present invention effectively seals contaminated fluids from clean fluids and also allows for the continual discharge of solids while the filter device vibrates.

Figure 7:
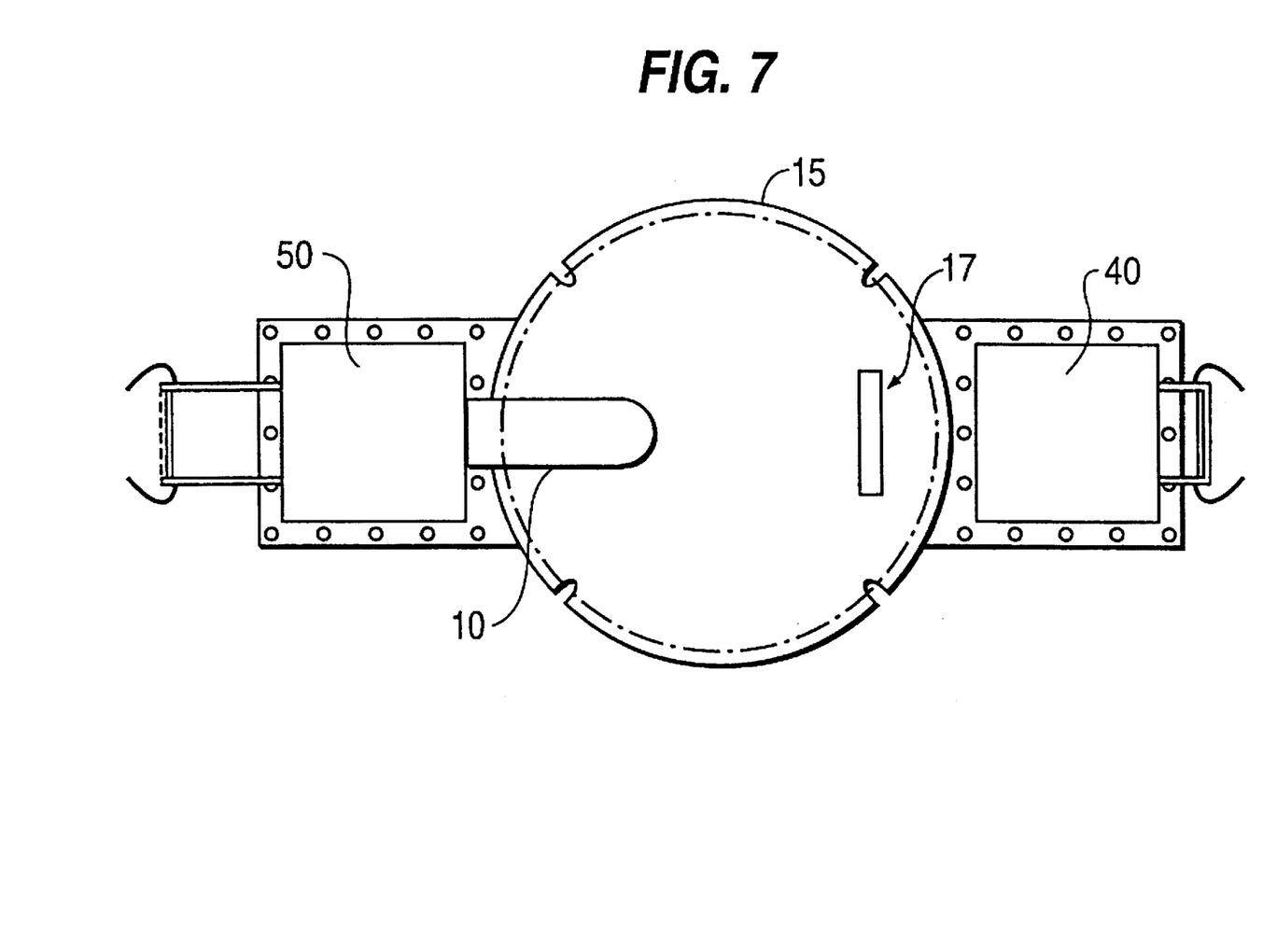
FIG. 7 illustrates a top view of the self-cleaning filter apparatus of FIG. 2.

FIG. 7 illustrates a top view of the filter apparatus 1 shown in FIG. 2. As shown in FIG. 7, lid 15 preferably is circular in cross-section and has disposed therein inlet 10 and handle 17. Also shown are clean outlet 40 and contaminated outlet 50.

In accordance with an additional embodiment of the present invention, depicted in FIGS. 4A, 4B, 5A and 5B, there is provided a self-cleaning filter apparatus 1 that includes a filter assembly 305 that rotates about central axis A—A. Filter assembly 305 is agitated by rotation in a first direction about the central axis A—A, then rotation in a second direction about central axis A—A. The number of rotations in each direction is determined by the type of fluid being filtered. For example, the filter assembly 305 could be rotated 10–15 times in a first direction, and then 10–15 times in a second direction when a very dense fluid is being filtered. Alternatively, the filter assembly 305 could be rotated less than a full revolution in each direction so that the filter actually oscillates about the central axis A—A, when a considerably less viscous fluid is flowing through the apparatus. By rotating about axis A—A, self-cleaning filter apparatus 1 enables the filter 305 to continuously move through the clean fluid and independently remove the debris and contaminants that have accumulated thereon without the need for an additional forced air or water back-washing mechanism or a scraping mechanism.

Figure 4A:
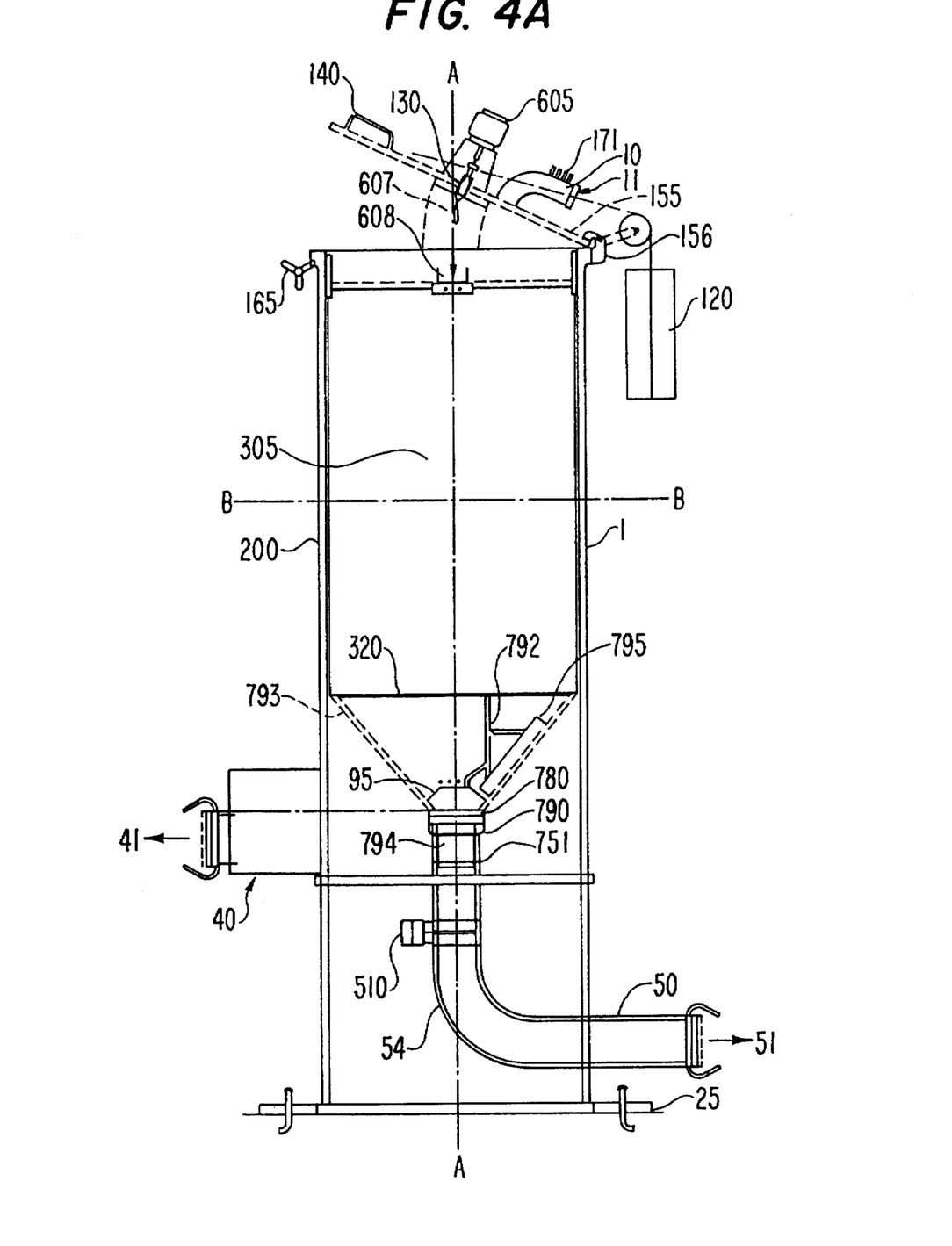
FIGS. 4A and 4B illustrate another preferred self-cleaning filter apparatus whereby the filter assembly is rotated relative to the longitudinal axis of the filter assembly.

Self-cleaning filter apparatus 1 operates by introducing contaminated fluid 11 through inlet 10 in lid 155. Lid 155 can be constructed of the same or different material than housing 200. Preferably, lid 155 is constructed of a lightweight, sturdy material such as aluminum. Lid 155 preferably is mounted on a hinge or hinges 156 and can be sealed with a gasket similar to gasket 16 shown in FIG. 2. Lid 155 has an attachment (not shown) to allow inlet 10 to pass therethrough and permit the introduction of contaminated fluid 11 to the filtering device. Because various inlet pipes 10 may be used depending upon the contaminated fluid 11 to be filtered, the attachment in lid 155 is designed to permit a quick connection and disconnection with various inlet pipes 10. The skilled artisan readily recognizes how to design various quick connection attachments suitable for use in the present invention. In addition, inlet 10 may be equipped with a manifold 171 which enables the introduction of chemicals which break down solids and enhance the filtering efficiency.

When the agitating mechanism 605 is disposed on top of the self-cleaning filter apparatus 1, a counterweight 120 or winch may be employed to assist in raising and lowering of lid 155. The non-hinged portion of lid 155 can be attached to housing 200 with snap lugs or wing nuts 165 for quick removal and replacement. Lid 155 also can be equipped with a handle 140 which permits easy lifting and lowering of the lid.

Figure 5A:
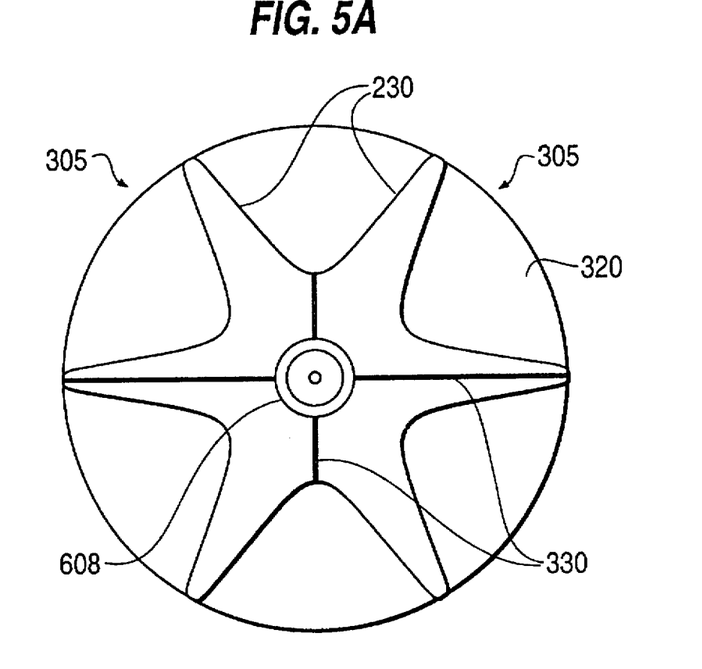
FIGS. 5A and 5B illustrate a top view of a filter assembly used in the apparatus of FIGS. 4A and 4B.

The downstream end of filter 305 shown as reference numeral 320 in FIGS. 4A and 5A, can be connected to contaminated outlet 50 by coming to rest on angled solids pan 793, which in turn is connected to compression gasket 780 and tapered roller bearing 790. Angled solids pan 793 may be integrally connected to support plate 320 which is attached to the axially extending spokes 230 of filter 305, whereby the axially extending spokes 230 also extend from support plate 320 to the upstream end of filter 305. The filter assembly 305 including the axially extending spokes 230 is perforated to permit clean, filtered fluid to pass therethrough and into the clean fluid reservoir between housing 200 and filter assembly 305, including the space between axially extending spokes 230. Those skilled in the art will appreciate that the filter apparatus illustrated in FIG. 4A is not drawn to scale, and that the size of the clean fluid reservoir spacing between housing 200 and filter assembly 305 can be greater than that shown in FIG. 4A.

Compression gasket 780 typically surrounds the lower portion of angled solids pan 793 and may be pressed into the top portion of a bearing 790. Bearing 790 can be a tapered roller bearing, or a brass bushing. Integrally connected to angled solids pan 793 is extension 794 which extends down and into contaminated outlet 50. Extension 794 may be secured to contaminated outlet 50 using a snap ring 751 in the same manner as snap ring 750 was used in the embodiment illustrated in FIG. 2. Extension 794, which is attached to angled solids pan 793 rotates along with the filter 305 during movement of the filter, and this rotating movement is permitted by bearing 790.

Using the configuration illustrated in FIG. 4A, filter 305 can be attached to contaminant outlet 50 in a manner that seals off the contaminated fluid from the clean, filtered fluid while leaving the downstream end of filter 305 and the upper end of contaminated outlet 50 open for discharge of solids.

As shown in FIG. 4A, contaminated outlet 50 has an elbow similar to the elbow 55 shown in FIG. 2. This elbow can be formed in a rounded 90° angle, which assists in preventing clogging in contaminant outlet 50 while solids are discharged. Numerous mechanisms can be employed to discharge contaminants from self-cleaning filter apparatus 1 without the need of a 90° elbow. Those skilled in the art are capable of designing a contaminant outlet 50 using various geometries and angles, and the particular embodiment depicted in FIG. 4 represents a preferred embodiment. In addition, the elbow of contaminant outlet 50 may be supported by a 90° support (not shown), as described above with respect to the embodiment illustrated in FIG. 2.

Contaminant outlet 50 can be connected to housing 200 by welding, adhesive, or any other means of integrally connecting it to the housing. A valve 510 (i.e., knife valve with timer control) can be disposed within contaminant outlet 50 to permit periodic and timed dumping of contaminants (solids), when necessary.

The rotation of filter 305 can be effected by agitating mechanism 605 which is attached to the filter 305 through shaft 607. Shaft 607 in turn engages filter sprocket 608 which is connected to filter 305. As shown in FIG. 5A, filter sprocket 608 is connected to support rods 330 which facilitate the rotating motion of filter assembly 305. Agitating mechanism 605 can be any mechanism that will provide a rotation movement of filter 305 including, but not limited to, manual means, pumps, hydraulic lifts, motors (gas, diesel, electric, etc.), and the like. The particular agitating mechanism 605 employed typically will depend upon the size of filter 305 and the amount of rotation desired. Preferably, agitating mechanism 605 is an electric motor (either a belt-drive or direct-drive motor), and more preferably, a 110/115 volt belt drive motor with an agitating transmission that permits rotating movement of shaft 607.

Shaft 607 can be any shaft capable of withstanding the stress generated by agitating mechanism 605. Preferably, shaft 607 is a case hardened pin with a seal through lid 155 and a splined slip joint which permits up and down movement to prevent any pressure that may build up on the shaft when lid 155 is clamped down in the sealed position. Shaft 607 pierces lid 155 and typically can be surrounded by a seal (not shown), on the top or bottom of lid 155, or both, which prevents leakage of the fluid. Shaft 607 also preferably is connected to a splined slip joint to permit some up and down longitudinal movement along axis A—A, and to prevent pressure build-up on the top or bottom seals when lid 155 is closed in a sealed position. Preferably, the seals are made of an elastomeric material similar to the material used to make gasket 16 as shown in FIG. 2. In addition, the slip joint preferably is made of a material similar to bushing 620 shown in FIG. 2, i.e., a teflon packed brass bushing that is machine fitted to the shaft.

Although not illustrated in FIG. 4A for purposes of clarity, housing 200 can include two inspection or access boxes similar to access boxes 210 and 220 which are shown in FIG. 2. These access boxes can be fabricated in the same or similar manner to the access boxes utilized in the vibration filter embodiment of FIG. 2. Also not illustrated in FIG. 4A, housing 200 further can include a port hole disposed immediately adjacent the snap ring 751, whereby the port hole can have a cover (also not shown), preferably a snap on cover. This port hole and cover permit simple and easy removal of the snap ring 751 without having to unbolt either of the access boxes.

To change the filter 305, lid 155 simply is opened, and the filter 305 then can be easily lifted from the housing 200 after disengagement with filter sprocket 608, and replaced with another filter should a different filter be needed to filter a different contaminated fluid 11.

Filter 305 preferably is cylindrically-shaped and has an axial cross-section that enables the removal of accumulated debris and other contaminants when the filtering assembly 305 is rotated about axis A—A. An axial cross-section of a particularly preferred embodiment of filter 305 is illustrated in FIG. 5A, which is a top view of filter 305 along axis B—B as shown in FIG. 4A. Preferably, the axial cross-section of filter 305 includes spokes extending axially from the center and connected to form an oval or star-shaped cross-section.

Referring now to FIGS. 4A and 5A, there is shown an axial cross-section of particularly preferred star-shaped filter assembly 305, and side view of an alternative embodiment of filter assembly 305. With respect to FIG. 5A, filter assembly 305 is shown with axially extending spokes 230. The clean, filtered fluid is present in between the axially extending spokes 230, housing 200 and support plate 320. Support plate 320 does not extend to or engage housing 200. The clean, filtered fluid thus is free to flow in the reservoir between axially extending spokes 230, housing 200 and support plate 320, and then discharged from clean outlet 41.

Figure 5B:
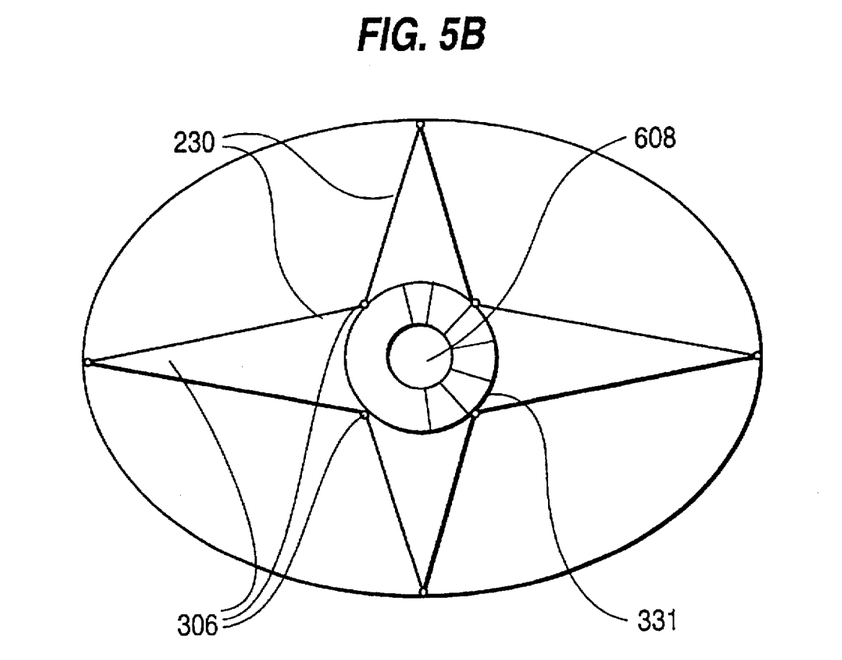
Figure 5C:
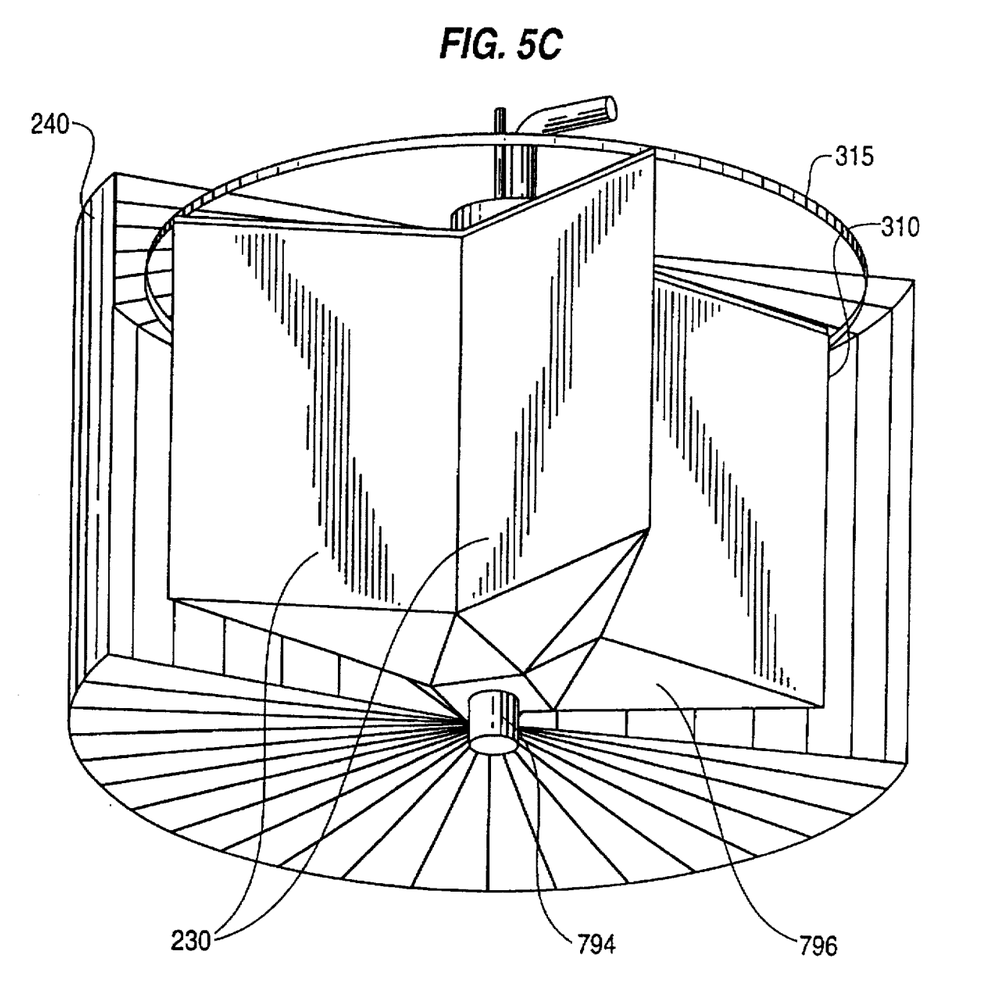
FIG. 5C illustrates a side view of a filter assembly used in the apparatus of FIG. 4A.

In an alternative embodiment, support plate 320 and angled solids pan 793 can be replaced by a single angled support plate 796, as shown in FIG. 5C. As shown in FIG. 5C, filter 305 can be comprised of filter insert 310 which is made of the same or similar mesh material as previous mentioned filter elements. Filter insert 310 is supported on the upstream side by support band 315. The downstream end of filter insert 310 is supported by angled support plate 796, which can be made from the same material as angled solids pan 793, such as stainless steel, or the like. Angled support plate 796 can be connected to extension 794 in the same manner as described above in reference to FIG. 4A. In addition, housing 200 can be replaced by drum 240, which also can be made of stainless steel or the like, or the entire drum 240 can be placed within housing 200. Drum 240 has a clean outlet 41 (not shown) similar to that shown in FIG. 4A. By referring to FIG. 5C, it is clear to see how clean, filtered fluid flows freely in the reservoir between drum 240 and axially extending spokes 230 of filter insert 310 to be discharged via clean outlet 41, and it is clear to see how filtered debris and other contaminants can be discharged via extension 794 and ultimately, contaminant outlet 51.

Referring now to FIG. 5A, the central portion, (i.e., that portion within the boundaries defined by axially extending spokes 230), on the upstream side of filter 305 is open and is connected to the shaft 607 of agitating mechanism 605 by means of sprocket 608 and support rods 330. Support rods 330 extend from sprocket 608 and attach to either one of the axially extending spokes 230. As shown in FIG. 5C, support rods 330 could be attached to support band 315. Hence, in operation, the rotating motion of shaft 607 will, when engaged, cause sprocket 608 to rotate and by virtue of support rods 330, will cause filter 305 to rotate axially about axis A—A.

As shown in FIGS. 4A, 5A and 5C, the contaminated water 11 which is introduced via inlet 10 will be present in the upstream, or interior portion of filter 305. Clean, filtered water will be present in the reservoir formed between housing 200, axially extending spokes 230 and support plate 320, as shown in FIG. 5A, or in the reservoir between drum 240 and axially extending spokes 230 as shown in FIG. 5C. By rotating filter 305 in this manner, any contaminants and/or debris that have accumulated inside the filter 305 or inside filter insert 310 will be removed as the filter element is rotated back and forth through clean fluid. This rotating action therefore serves to independently remove debris and other contaminants that have accumulated on the filter without the need of additional forced fluid or air jets or additional scraping mechanisms. The contaminants or debris that are removed from the filter 305 are removed from the filter apparatus 1 via contaminant outlet 50. Removal can be effected by gravity or by means of a pump or vacuum generating device.

Figure 4B:
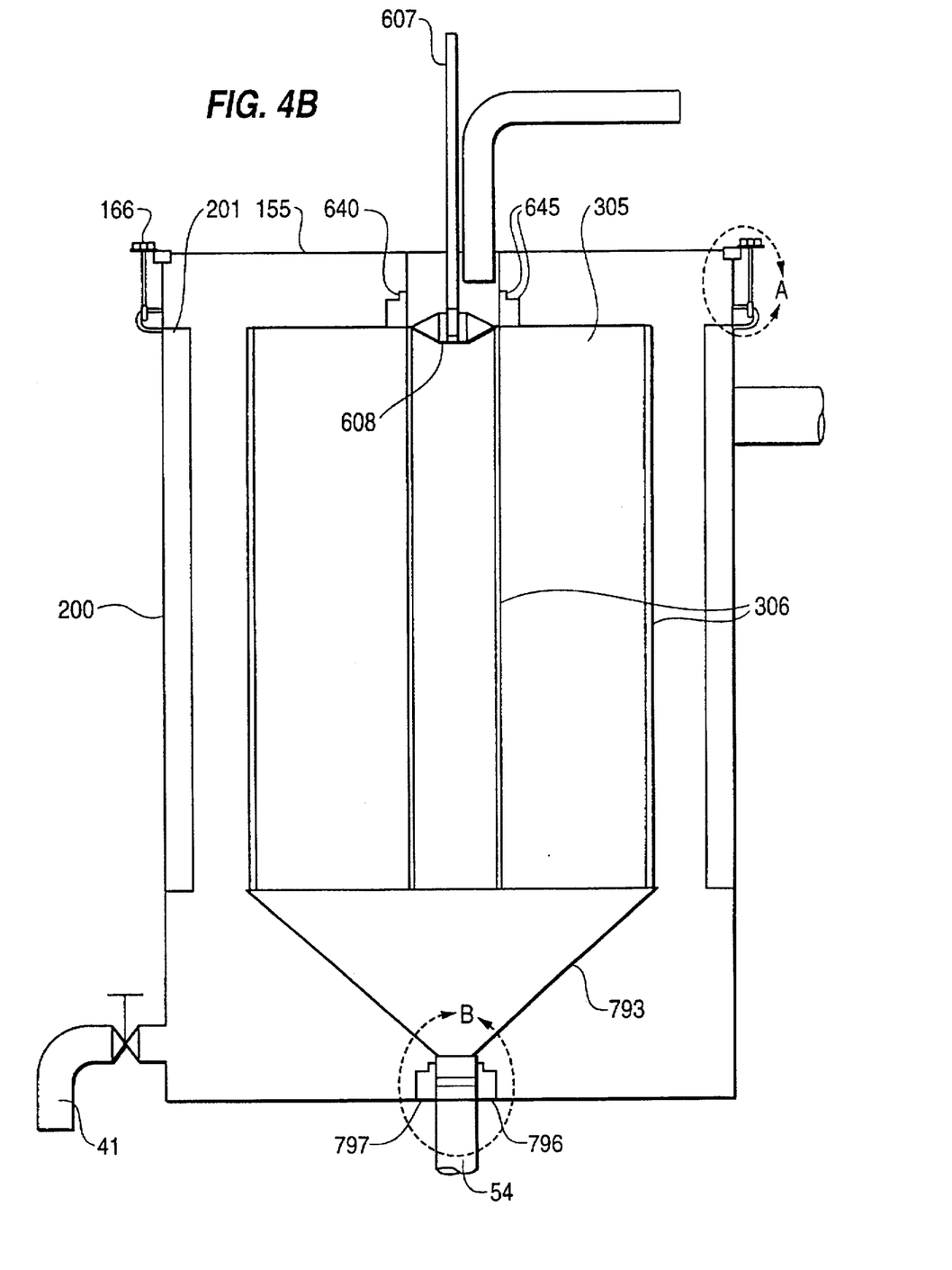

In yet another alternative embodiment shown in FIGS. 4B and 5B, there is provided a self-cleaning filter apparatus 1, whereby the filter assembly 305 is a four-spoked element having eight axially extending spokes 230. Agitating mechanism 605 (not shown) can optionally be present on lid 155 of the apparatus or supported by an external support mechanism. If agitating mechanism 605 is not heavy, or is supported by an external support mechanism, there is no need for counterweight 120 to assist in raising lid 155. Agitating mechanism 605 is attached to filter assembly 305 via shaft 607 which in turn engages sprocket 608. Sprocket 608 then is attached to filter assembly 305 by means of support rods 331, which are similar to spokes on a conventional bicycle wheel rim. Filter assembly 305 also is supported by support bars 306, which extend from the downstream end of filter assembly 305 to the upstream end, as shown in FIG. 4B.

Figure 9:
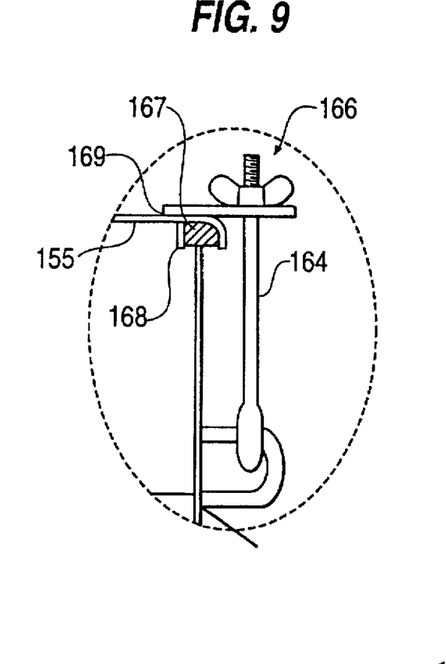
FIG. 9 illustrates the connecting device shown in the circle A of FIG. 4B.

Housing 200 can be equipped with baffles 201 which serve to assist in the rotating movement of filter assembly 305, and assist in the agitating action of the filtered fluid. These baffles may extend perpendicularly to the inside of housing 200, or may extend at an angle. Those skilled in the art will appreciate that baffles 201 can be included within either of the housings illustrated in FIGS. 2 or 4A. Lid 155 can be secured by locking mechanism 166, illustrated by portion A in FIG. 4B, an expanded view of which is shown in FIG. 9. Referring now to FIG. 9, locking mechanism 166 can be seen in greater detail, and includes a swivel locking nut, a gasket 167 which surrounds lid 155, a retainer 168 to hold gasket 167 in place, and extender 169 to connect the locking pin 164 to lid 155.

Figure 10:
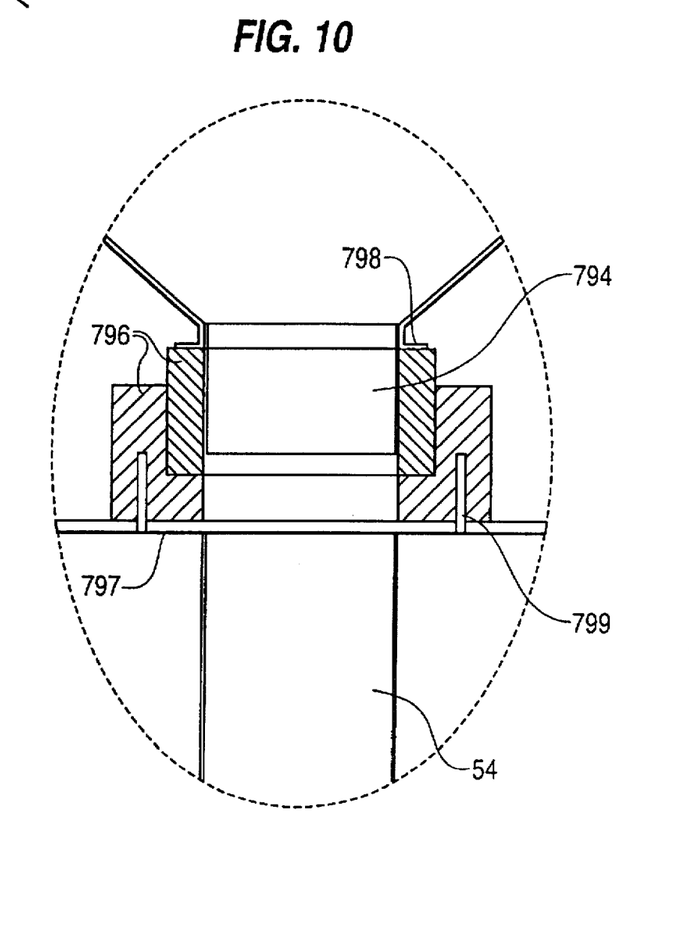
FIG. 10 illustrates a connection between the filter assembly and fluid outlet shown in circle B of FIG. 4B.

The downstream portion of filter assembly 305 can be connected to contaminant outlet 51 via connecting pipe 54. Connecting pipe 54 is attached to extension 794 in the same manner as described with reference to FIG. 4A. Specifically, angled solids pan 793 and extension 794 will rotate with filter assembly 305 and are freely rotatable, which is facilitated by bushings 796, fitted tightly around extension 794. An expanded view of this attachment, which also is applicable to the embodiment illustrated in FIG. 4A, can be seen in FIG. 10. As shown therein, bushings 796 are fitted tightly around extension 794 and are held in place by retaining pin 798. A bottom portion 797 of housing 200 is fitted with a hole so that connecting pipe 54 will fit snugly therein, with the aid of a gasket (not shown). The outer bushings 796 shown in FIG. 10 are attached to bottom portion 797 by means of retaining screws or pins 799. Filter 305, as shown in FIG. 4B therefore is free to rotate in the same manner as described in reference to FIG. 4A.

The self-cleaning filter apparatus 1 shown in FIGS. 4A, 4B, 5A, 5B and 5C operates in the following manner. Filter assembly 305 is suspended in the clean fluid reservoir and connected to an agitating mechanism 605 by a sealed shaft 607 which protrudes through lid 155 and connects to sprocket 608. Sprocket 608 is connected to support rods 330, 331, which in turn are connected to filter 305. Contaminated fluid 11 is introduced into self-cleaning filter apparatus 1 from inlet 10 and through lid 155. "Dirty" or contaminated fluid flows through filter 305 and becomes clean, filtered fluid within the clean fluid reservoir. Rotation of filter 305 further aids in forcing contaminated fluid through the walls of filter 305. Rotation, gravity and the agitation of the filter, causes solids accumulated on the upstream walls of filter 305 to fall and collect on the downstream side of the filter and onto angled solids pan 793, which then may be forced out the bottom via contaminant outlet 50 as contaminated fluid 51. Those skilled in the art recognize that various mechanisms can be used to facilitate the removal of contaminated fluid 51 from the self-cleaning filter including, but not limited to, hydraulic and pneumatic pumps, and other pumping devices. Clean fluid 41 exits the apparatus via clean outlet 40.

Contaminated fluid 11 is introduced to the self-cleaning filter apparatus 1 and contaminated fluid 51 and clean fluid 41 are continuously removed from the apparatus unit. The reciprocating rotation of filter 305 serves to remove any accumulated debris and other contaminants from the mesh screens of the filter 305. Because filter 305 is suspended in the clean fluid reservoir within housing 200, the weight of filter 305 and contaminated fluid 11 which must be rotated by agitating mechanism 605 is reduced.

Filter 305 is readily removable from housing 200 and replaced with other filters having varying sizes and shapes in order to effectively filter various different contaminated fluids 11. Lid 155 is raised, and shaft 607 is disengaged with sprocket 608. Sprocket 608 and support rods 330 then can be removed from filter 305, or alternatively, various filters 305 can be designed which are integrally connected to a suitable sprocket 608 and support rods 330. Filter 305 then can simply be hoisted from housing 200 and replaced. The unique design of self-cleaning filter apparatus 1 of the present invention effectively seals contaminated fluids from clean fluids and also allows for the continual discharge of solids while the filter device vibrates.

Particularly preferred embodiments of the present invention include specific design of the filter element 30, 300 or 305, and recycle feed-back of contaminated fluids 51 to inlet 10. Although not shown in the accompanying drawings, those skilled in the art will appreciate that the debris and other contaminants 51 removed from the filter apparatus via contaminated outlet 50 may be recycled, and recombined with contaminated fluid 11 and re-introduced to the filter assembly via inlet 10. Recycling can be used for various reasons such as to increase the solids content of fluid stream 51, should health, governmental or storage reasons dictate a certain required percentage of solids in fluid 51. Any means can be used to recycle the debris and other contaminants 51, and portions of this outlet stream can be recycled using automatic or manual means. Those skilled in the art are capable of designing an efficient recycle loop which will enable the most efficient and economical filtration of contaminated fluid 11.

In another particularly preferred embodiment of the invention, lid 15 may include an opening to permit air hose 100 to pass therethrough. As illustrated in FIG. 2, air hose 100 may be utilized as an auxiliary source of vibration to assist in removal of accumulated debris on filter 300. In accordance with this embodiment, air hose 100 is connected to a small vibrator 110 mounted in the center of filter 300. The small vibrator 110 causes filter 300 to vibrate and also produces soundwaves which transmit through the contaminated fluid and aid in the filtering process. In addition, inlet 10 may be equipped with a manifold 170 which enables the introduction of chemicals which break down solids and enhance the filtering efficiency.

In another particularly preferred embodiment of the invention, filter apparatus 1 illustrated in FIG. 4A may be equipped with a means 795 for assisting in the removal of solids from angled solids pan 793. Such means 795 include scraping devices or sweeping devices, and preferably include a wiper blade assembly that is capable of being rotating around the circumference of angled solids pan 793 by use of a pawl and rachet clutch (not shown) to wipe away any accumulated debris or other contaminants that have been filtered from contaminated fluid 11. Hence, during engagement of the pawl and rachet clutch, means 795 will rotate with angled solids pan 793, and during disengagement, means 795 will remain stationary by virtue of its weight against angled solids pan 793. In addition or alternatively, means 795 can be movably secured to support plate 320 to permit support plate 320 and angled solids pan 793 to rotate during disengagement from the pawl and rachet clutch. Movably securing means 795 to support plate 320 can be accomplished by using rod 792 (FIG. 4A) which can be fitted in a recess in the bottom of support plate 320.

Figure 6:
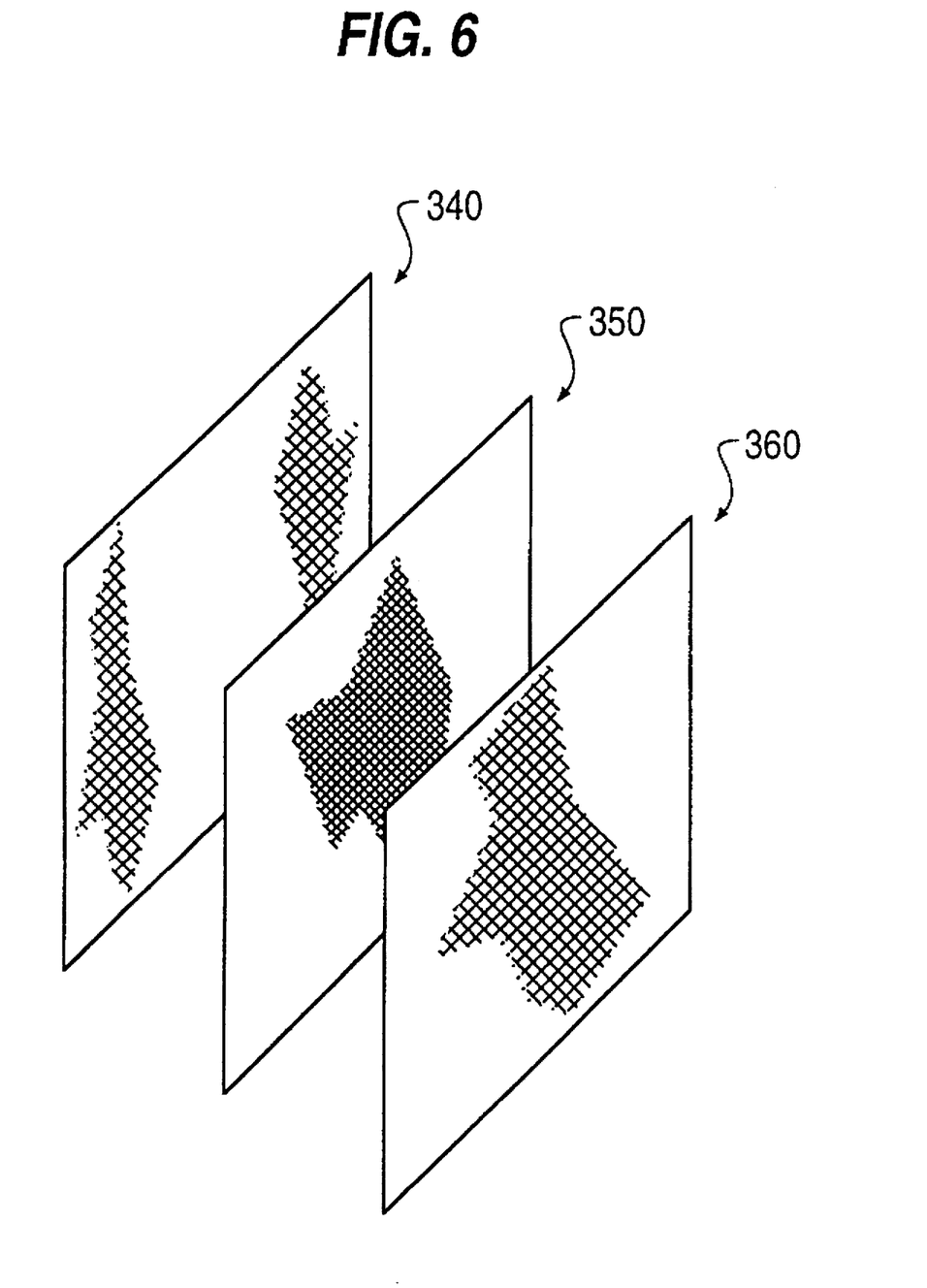
FIG. 6 illustrates a preferred filter assembly whereby three screens are attached to one another.

Filter 30, 300 or 305 (commonly referred to as filter 30) may be comprised of a single filtering screen or may be comprised of a plurality of filter screens or wire meshes as illustrated in FIG. 6. As shown in FIG. 6, a fine or small mesh screen 350 may be disposed between two coarser perforated metal walls or screens 340 and 360. Such an arrangement will prevent the fine or small mesh screen 350 from becoming displaced during agitation of the filter.

Those skilled in the art also will appreciate that filter 305 can be designed to rotate through the clean, filtered fluid to back-wash and clean the debris and other contaminants that have accumulated on filter 305. The axial cross-section of filter 305 need not be star-shaped as illustrated in FIGS. 5A, 5B and 5C, but may be oval shaped, or may include any number of axial spokes connected to one another. As filter 305 rotates about axis A-A, the debris or other contaminants that have accumulated on the upstream side of filter 305 will be forced from the upstream side of the filter by a backwashing action as the filter moves through the clean fluid.

The skilled artisan further will appreciate that any fluid may be filtered in accordance with the claimed invention, including but not limited to, contaminated liquid or air, as well as contaminated organic solvents and biological solutions. Ordinarily skilled artisans are capable of substituting a suitable filter 30, 300 or 305 to filter contaminants from any of these fluid streams.

While the invention has been described in detail with reference to particularly preferred embodiments, those skilled in the art will appreciate that various modifications may be made to the claimed invention without departing from the spirit and scope thereof.

What is claimed is:

1. A self-cleaning filter apparatus comprising a housing;

an inlet operatively attached to said housing that supplies fluid to said housing;

a contaminant outlet operatively attached to said housing;

a clean outlet operatively attached to said housing and;

an elongated filter assembly having a cross section selected from the group consisting of oval shaped and star shaped, said filter assembly includes an inner upstream side, and an outer downstream side, and a central axis, said filtering assembly being disposed within said housing so that said fluid is introduced through said inlet to said inner upstream side of said filtering assembly, and said fluid is passed through said filtering assembly to said outer downstream side to provide clean, filtered fluid which is discharged through said clean outlet, while debris and other contaminants contained in said fluid are separated from said fluid and retained by said filtering assembly on the inner side of the filter assembly; and an agitating means for agitating the filtering assembly and operatively connected to said filtering assembly, wherein the agitating means agitates the filtering assembly by rotating the filtering assembly in a first direction about the central axis, then rotating the filtering assembly in a second direction about the central axis to remove said debris and other contaminants retained by said filtering assembly.

2. A self cleaning filter apparatus as claimed in claim 1, wherein said filtering assembly comprises a fine screen mesh disposed between two coarser perforated screens.

3. A self cleaning filter apparatus as claimed in claim 1, wherein said agitating device comprises a motor and connecting arm.

4. A self cleaning filter apparatus as claimed in claim 1, wherein said housing is cylindrical.

5. A self cleaning filter apparatus as claimed in claim 1, further comprising a lid, wherein said lid is disposed on said housing and provided with said inlet to permit rapid connection and disconnection of said inlet.

6. A self cleaning filter apparatus as claimed in claim 1, wherein said cylindrical filtering assembly comprises a plurality of spokes extending axially from the center of said filtering assembly.

7. A self cleaning filter apparatus as claimed in claim 6, wherein said plurality of spokes are connected to one another to form a star shape.

8. A self-cleaning filter apparatus as claimed in claim 1, wherein the the agitating means causes the filtering assembly is rotated in the first direction 10–15 times, and then rotated in the second direction 10–15 times.

9. A self-cleaning filter apparatus as claimed in claim 1, wherein the filtering assembly is rotated less than a full revolution in the first direction, and then rotated in less than a full revolution in a second direction so that the filtering assembly oscillates about the central axis.

10. A self-cleaning apparatus as claimed in claim 1, wherein the apparatus removes the debris and other contaminants retained by the filtering assembly without having additional forced air or water back-washing mechanisms.

* * * * *